United States Patent [19]

Robinson et al.

[11] Patent Number: 5,415,733
[45] Date of Patent: May 16, 1995

[54] METHOD OF REMOVING HYDROPHILIC INK

[75] Inventors: Peter M. Robinson, High Point; Stephen P. Williams, Winston-Salem; Thomas F. Skaar, Jamestown; Hideaki Urushibata, High Point, all of N.C.

[73] Assignee: High Point Chemical Corp., High Point, N.C.

[21] Appl. No.: 68,417

[22] Filed: May 27, 1993

[51] Int. Cl.⁶ .................................................. D21C 5/02
[52] U.S. Cl. ............................................. 162/5; 162/8
[58] Field of Search ..................................... 162/5, 4, 8

[56] References Cited

U.S. PATENT DOCUMENTS

| | | | |
|---|---|---|---|
| 4,043,908 | 8/1977 | Roberts et al. | 210/43 |
| 4,959,123 | 9/1990 | Lehmann et al. | 162/5 |
| 5,015,334 | 5/1991 | Derrick | 162/183 |
| 5,167,766 | 12/1992 | Honig et al. | 162/175 |
| 5,178,770 | 1/1993 | Chung | 162/189 |
| 5,200,034 | 4/1993 | Richmann et al. | 162/5 |
| 5,221,433 | 6/1993 | Dante et al. | 162/5 |
| 5,246,548 | 9/1993 | Aston et al. | 162/199 |
| 5,248,388 | 9/1993 | Richmann et al. | 162/5 |
| 5,269,942 | 12/1993 | Harrington, IV et al. | 162/5 |
| 5,286,346 | 2/1994 | Engelskivchen et al. | 162/8 |

Primary Examiner—W. Gary Jones
Assistant Examiner—Mark De Simone
Attorney, Agent, or Firm—Bruce F. Jacobs

[57] ABSTRACT

The removal of inks, particularly hydrophilic flexographic inks, from a pulp fiber slurry is accomplished by use of a combination of (a) a non-ionic surfactant; (b) a fatty acid or salt thereof; and (c) a water-soluble cationic polymer having a molecular weight less than about 1,000,000 daltons, particularly a polymer derived from the reaction of epichlorohydrin and at least one diamine or the polymerization of aziridine.

48 Claims, No Drawings

METHOD OF REMOVING HYDROPHILIC INK

BACKGROUND OF THE INVENTION

The present invention is directed to the removal of inks from recycled paper products, i.e. deinking. "Deinking" is the process of removing ink and other contaminants from waste paper and there are two main techniques in current use. "Flotation deinking" entails forming an aqueous suspension of waste paper pulp fibers, ink, and other non-cellulosic contaminants and then mixing air into the suspension. In the presence of certain additives, air bubbles selectively attach to ink particles and carry those particles to the surface of the aqueous suspension, thereby forming an ink rich froth. The froth is then removed leaving behind a relatively ink-free fiber slurry. Flotation deinking processes are especially useful in removing hydrophobic inks with particle sizes larger than about 10 $\mu$m. The additives used in such processes are generally specialty surfactants or fatty acids which are intended to agglomerate the relatively finer ink particles to increase removal efficiency in the flotation stage. The presence of additives which would disperse the ink particles rather than agglomerate them is considered detrimental to the effectiveness of the flotation stage.

"Wash deinking", on the other hand, is particularly useful when the ink and other particles being removed are finely dispersed so that the particles are smaller than about 5 $\mu$m. This requires the addition of dispersants so that when a dilute waste paper pulp slurry is thickened, the fine flexographic type inks will tend to stay with the water being removed. Thus a relatively clean pulp is produced.

Newspapers, magazines and other printed media have been recycled for many years. Recently the need to recycle paper has increased significantly and will likely continue to increase in the future in view of environmental concern and legislative action. To reclaim fibers from printed material, a deinking process is required to remove the ink and other contaminants. Deinking of waste paper has become increasingly more difficult, however, because of changes in the printing techniques being used and the wide variety of printing inks. As a result, a slurry of recycled waste paper contain mixtures of inks, resin binders, fillers, and the like, which must be removed. The materials being removed have a wide range of particle sizes. The use of polymeric binders such as polystyrene, polyacrylates, and acrylic copolymers, has made removal of many of the newer inks more difficult or impossible in a wash-only deinking process. The industry response has generally been to utilize deinking systems which combine both flotation and washing processes.

However, the requirements for flotation and wash processes are different and are in conflict with each other. In flotation processes the ink particles are agglomerated to a size where they can be removed while in washing processes the ink particles are reduced in size and highly dispersed so that they can be removed.

This dichotomy has been further effected by recent changes in printing techniques which have resulted in an increasing usage of hydrophilic flexographic inks. The very small ink particles (<5 $\mu$m) associated with such flexographic inks are generally removed by means of a washing process. However, the very fine particle size of flexographic inks and the increasing use thereof has caused increasing problems in attaining the brightness necessary to enable the use of recycled paper products in many applications.

The conventional industry chemical formulations for flotation deinking for many years have included a fatty acid or fatty acid soap. See, for example, U.S. Pat. Nos. 4,964,949 and 4,483,741. However, fatty acids and fatty acid soaps have a number of problems associated with them, e.g. high dosage rates (typically about 16 pounds/ton of waste paper but as high as 30 pounds/ton), relatively poor foamability thus causing the high dosage rates, and the general need for high levels of water hardness to achieve acceptable performance. The hard water often leads to handling problems as well as scale and deposit buildup on mill equipment because of precipitation of the fatty acid soaps. More recently, non-ionic surfactants have been developed for use in deinking systems.

However, neither the fatty acids/fatty acid salts nor the non-ionic surfactants alone or in combination have been able to efficiently agglomerate the very fine hydrophilic flexographic ink particles sufficiently to allow their removal in a flotation unit operation. The problem is compounded for removal of hydrophilic flexographic inks because deinking processes are generally operated under alkaline pH, between about 8.5 and 10, while the hydrophilic flexographic inks become insoluble at pH's below about 7 so that neutral or acidic conditions are desired for their removal.

The use of various types of cationic materials in compositions for removal of inks from waste paper has been disclosed in several earlier patents. For example, polyoxyalkylene compounds containing amine or quaternary ammonium groups have been disclosed in such as U.S. Pat. Nos. 4,483,741, 4,605,773, JP 59 137587, DE 3,928,599, DE 4,007,598, and DE 4,007,597. Similar formulations which are claimed to be effective specifically for deinking of paper printed with flexographic inks have been disclosed in DE 4,007,596, WO 90 05806 and EP 478505. Surfactants such as the ones described in the preceding patents may be regarded as materials in which a single substance contains both non-ionic and cationic moieties. None of these prior art compositions, however, have been found capable of adequately removing the very fine hydrophilic inks in a flotation deinking stage or a combined flotation and wash deinking system.

Accordingly, it is an object of the present invention to provide a method of deinking printed media which contains very fine hydrophilic ink particles, e.g. the flexographic inks present in increasing quantities in waste paper, in a flotation deinking process.

It is a further object of the invention to remove the inks while minimizing the hardness of the water used in the aqueous slurry.

These and still further objects will be apparent from the ensuing description of the present invention.

SUMMARY OF THE INVENTION

The present invention is directed to a deinking method which is useful in removing hydrophilic inks from recycled printed media, said inks either alone or in combination with hydrophobic inks, in a flotation deinking system or combined flotation/wash deinking system. The deinking method generally entails adding to an aqueous waste paper pulp slurry each of (a) a nonionic surfactant which is alkoxylated; (b) a fatty acid or salt thereof; and (c) a water-soluble cationic polymer having a weight average molecular weight less than about 1,000,000 daltons and at least about 50% cationicity, preferably a cationic polymer derived from either the reaction of epichlorohydrin and a dialkylamine or by polymerization of aziridine or a quaternized derivative thereof. The deinking method of the present invention effectively and efficiently removes hydrophilic inks in a flotation process or in the flotation stage of a combined flotation/wash process.

By using this combination of materials at appropriate levels, release of the inks from the waste paper fibers can be accomplished without overdispersing the inks while simultaneously initiating agglomeration of the fine ink particles and then completing the agglomeration to a sufficient extent that the ink particles coalesce and are of sufficient size to be effectively and efficiently removed in the froth of conventional flotation deinking equipment.

DETAILED DESCRIPTION OF THE INVENTION

More particularly, the non-ionic surfactant used in the present invention is a non-ionic alkoxylated surfactant which may be represented by the general formula:

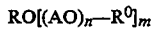

$$RO[(AO)_n-R^0]_m$$

wherein

AO is an oxyalkylene group having 2 to about 4 carbon atoms or a mixture of such groups in random or block configuration;

R is selected from the group consisting of (a) linear and branched alkyl and alkenyl groups having about 7 to about 24 carbon atoms; (b) $R^1CO-$ wherein $R^1$ is a linear or branched alkyl or alkenyl group having about 7 to about 24 carbon atoms; (c) $(R^2)_aC_6H_{5-a}-$ wherein $R^2$ is linear or branched $C_7-C_{24}$ alkyl and alkenyl and "a" is an integer from 1 to 3; (d) a group derived from a linear, branched, and cyclic aliphatic polyol having about 2 to 6 carbon atoms; and (e) a group derived from a linear, branched, and cyclic aliphatic diacid having about 8 to 42 carbon atoms;

$R^0$ is selected from the group consisting of H, $R^1$ and $R^1CO$;

n is a number from about 4 to about 250; and m is an integer from about 1 to 6.

Suitable polyols include, for example, ethylene glycol, propylene glycol, trimethylene glycol, butylene glycol, glycerol, trimethylopropane, trimethylolethane, 1,2,4-butanetriol, 1,2,6-hexanetriol, 1,1,1-trimethylol hexane, pentaerythritol, diglycerol, and sorbitol. Suitable diacids include, for example, octanedioic (suberic), nonanedioic (azelaic), hexadecanedioic (thapsic), octadecanedioic, and heneicosanedioic (japanic) acids.

The non-ionic surfactant component may comprise mixtures of two or more ethoxylated and/or propoxylated materials. Presently preferred non-ionic surfactants include surfactants based on mono- and diglycerides or a naturally occurring fatty acid which have been ethoxylated and/or propoxylated. A particularly preferred non-ionic surfactant is the mixture derived from the reaction of a fat such as tallow with potassium hydroxide, glycerol, ethylene oxide and propylene oxide such as is described in U.S. Pat. Nos. 4,964,949 and 5,100,574 which includes as major components each of the following structures:

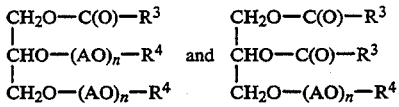

wherein $R^3$ is an alkyl group derived from the fat, e.g. the tallow and $R^4$ is H or $R^1CO$. The non-ionic surfactant generally functions as a penetrant of the paper fiber in the slurry and stabilizes the ink particles so that they do not redeposit on the pulp fibers. Generally, the non-ionic surfactant component is either commercially available or may be made by techniques well known in the art.

The non-ionic surfactant component is generally used in the present invention in an amount of from about 0.01 to 0.6 wt % based on the weight of the waste paper, more preferably from about 0.05 to 0.4 wt %, and most preferably of from about 0.1 to 0.3 wt %. The non-ionic surfactant is generally added at the pulper stage of the papermaking process.

The second component of the composition is a fatty acid or salt thereof of the formula $R^5COO-M$ wherein $R^5$ is a linear, branched, or cyclic alkyl or alkenyl group having about 7 to about 48 carbon atoms and M is hydrogen or a counterion such as Na, K, Ca, NH$_4$, or NH$_x$(CH$_2$CH$_2$OH)$_y$ wherein x and y are each integers from 0 to 4 and total 4.

Most commonly, for economic reasons, the fatty acid or salt thereof are used in the form of mixtures of such materials having about 12 to 48 carbon atoms and derived from natural oils such as marine, rapeseed, tallow, tall oil, soy, cottonseed, coconut, and the like. Such fatty acids, salts, and mixtures are generally either commercially available or may be manufactured by known techniques. The fatty acid functions primarily to agglomerate ink particles. The fatty acid or the salt thereof is generally present in an amount from about 0.05 to 1.8 wt % based upon the weight of the waste paper, more preferably from about 0.1 to 0.8 wt %, and most preferably from about 0.2 to 0.5 wt %. The fatty acid or salt is added either to an aqueous pulp slurry at the pulping stage or to the pulp slurry prior to its introduction to the flotation stage.

The cationic polymer component of the composition of the present invention is one having a weight average molecular weight below about 1,000,000 daltons, preferably below about 500,000 daltons, most preferably below about 200,000 daltons, and a cationicity of at least about 50%, preferably at least about 90%. While the specific chemical structure of the cationic polymer has been found to be less important than its molecular weight and cationic charge, certain cationic polymers are currently preferred. Specifically preferred is a cationic polymer which is derived from the reaction of epichlorohydrin with an amine. More particularly, the amine is a C$_{2-6}$ dialkylamine or a mixture of a C$_{2-6}$ dialkylamine and an aliphatic diamine. Suitable such cationic polymers are described in U.S. Pat. Nos. Re. 28,807 and Re. 28,808, which are incorporated herein by reference. Also preferred are polyethyleneimine polymers which are obtained by the polymerization of aziridine or a quaternized derivative thereof. Other useful cationic polymers include homo and copolymers containing a monomer such as dialkylaminoethyl (meth)acrylate or its quaternary salt with methyl chloride or dimethyl sulfate, dimethylaminopropylmethacrylamide or a quaternary salt thereof, acrylamidomethylbutyltrimethylammonium chloride, diallyldimethylammonium chloride, vinylbenzyltrimethylammonium chloride, and the like. Still other useful cationic polymers include Mannich derivatives of polyacrylamide polymers (reacted with formaldehyde and dimethylamine) as well as polyvinylimidazolines. Such cationic polymers are generally either commercially available or may be manufactured by known techniques.

The cationic polymer facilitates and accelerates more effective agglomeration of the very fine hydrophilic ink particles into particles amenable to effective removal in a flotation process. It is generally used in an amount sufficient to either increase brightness of a filter pad prepared from media wherein at least about 7.5% thereof was printed with a hydrophilic flexographic ink by at least about 2% or to increase the rate of ink removal as a function of time in the flotation cell or to increase the drainage rate of deinked media. Generally such amounts will be in the order of from about 0.005 to 0.5 wt % based upon the weight of the total waste paper, preferably from about 0.01 to 0.3 wt %, more preferably from about 0.04 to 0.2. The cationic polymer is added to the pulp slurry just prior to flotation.

The deinking technology of the present invention may be used with water hardness levels ranging from about 50 to about 500 ppm Ca. Preferably the water hardness is below about 150 ppm Ca since this level is sufficiently below the >200 ppm Ca level which is normally considered the threshhold level for the generation of undesirable deposits. When the fatty acid is used in the form of an aqueous calcium salt emulsion or dispersion, the water may have 0 ppm hardness.

The deinking procedure of the present invention entails the use of a flotation stage to remove very fine hydrophilic inks (flexographic inks) from printed media, particularly waste newspapers which up to 100% of the ink may be flexographic. Generally, the process comprises a pulping step wherein printed waste paper, often in combination with virgin wood pulp, is treated in an alkaline medium with water in a reactor having an agitation system. The benefits of this invention are clearly evident when at least about 7.5 wt % of the media was printed with a hydrophilic flexographic ink having a particle size of less than about 5 $\mu$m. The benefits become more evident as the flexographic ink content increases. The aqueous suspension so formed contains pulp fiber, inks, coatings, inorganic fillers, and the like, in an amount of from about 3 to 18 wt % and is maintained at a pH of about 7.5 to 11. Typical chemicals used in the pulper include such as NaOH and hydrogen peroxide. Sodium silicate, a metal chelating agent such as diethylenetriaminepentaacetic acid (DTPA), and calcium chloride may also be added to the pulper. According to the process of this invention, the non-ionic surfactant component is generally added directly to the pulper during the pulping stage, preferably near the beginning thereof.

After the slurry exits the pulper, it is diluted to about 1 wt % solids and the cationic polymer is added thereto and mixed therein. Generally the addition and mixing will be performed within the pipeline feeding the diluted pulp slurry into the flotation deinking equipment or immediately upon entering said equipment. The fatty acid or salt thereof may be added in the same manner and at about the same point in time as the cationic polymer. Alternatively, the fatty acid component may be added partially during the pulping operation and partially upon entry to flotation. Thereafter, air is introduced into the flotation equipment to cause vigorous mixing of the diluted pulp slurry.

As a result of the addition of the combination of (a) the alkoxylated non-ionic surfactant, (b) the fatty acid or salt thereof, and (c) the water-soluble cationic polymer, the hydrophilic ink particles are released from the recycled printed media and agglomerated into larger particles. The air bubbles then attach to the agglomerated fine ink particles and carry the agglomerated particles to the surface of the flotation equipment and form a froth thereon. This ink-rich froth is removed from the surface in any of the conventional manners well known in the art of deinking. A particular benefit of the present invention is the character of the froth which is produced. The froth is a mixture of bubble sizes with unusually good rigidity in the flotation equipment. However, upon leaving the flotation cell and the continuous air bubble supply, the froth quickly collapses so that the resulting inky liquid can be easily removed and sent to waste treatment for final disposal.

Following the flotation deinking procedure, the pulp slurry is thickened to about 6 to 12 wt % solids and washed using conventional equipment readily available and in widespread commercial use. The filtrate from the washing is typically treated in a dissolved air flotation (DAF) clarifier to remove inks, fillers, fiber fines, and other suspended solids so that the filtrate water can be recycled for use in a subsequent deinking procedure. Commonly, cationic, nonionic and/or anionic polymers are added to the filtrate prior to or in the dissolved air flotation clarifier so that the suspended solids will be agglomerated and/or flocculated and removed.

Many modifications and variations of the basic deinking procedure explained herein have been proposed and/or are in commercial use and the method of the present invention may be applied to those procedures. The simple system explained herein is used for illustration purposes only and is not meant to be in limitation of the scope of this invention. The pulping process may be carried out either in a continuous way or batchwise, with excellent results with any type of printed media including newspaper, magazines, printed cardboard and colored printed media. The recycled paper is fed to the process so that it is present in an amount of about 10 to 100 wt % of the fiber undergoing pulping. The equipment used in this process is conventional equipment which is readily available and in widespread use.

The deinking composition of the present invention has several advantages when compared to the conventional prior art, particularly when used in deinking printed media printed with water-soluble hydrophilic inks. Compared to conventional deinking methods, a significant increase in brightness with low residual ink content in the pulp after flotation is realized when using this method. The ink removal rate is also increased over conventional flotation methods, resulting in either increased production rates without sacrifice of product quality or reduction in the amount of flotation equipment required to achieve a specific production rate.

It has also been found that the dosage rate of the fatty acid component of the composition can be substantially reduced from the about 1-2 wt % for a conventional process to below about 0.5 wt % and as low as about 0.2 wt % for the present invention. This lower amount significantly reduces the potential for scale and deposit problems normally associated with fatty acid components of deinking formulations both in the deinking equipment itself and at the subsequent paper machine. Expensive down time for equipment clean-up is minimized and a higher quality final paper product can be produced.

Environmental concerns are causing paper mills to continually seek to reduce the amount of fresh water used. This means that increasing amounts of water must be reused. It is an advantage of the present invention that not only is the clarity of the filtrates produced in washing stages following the flotation deinking stage improved but also the subsequent drainage rate because of an increased removal of both inorganic fillers, e.g. calcium carbonate and titanium dioxide, and fiber fines which are in the waste paper pulp slurry being treated. In view of improved filtrate clarity, the amount of flocculants required for water clarification and subsequent reuse is reduced. In view of increased drainage rate, plant throughput can be increased.

The advantages of the deinking composition of the present invention as compared with conventional deinking compositions are further illustrated in the following Examples in which all parts and percents are by weight unless otherwise specified. All filter pads for brightness were made using alum as specified in TAPPI Test Method T 218 om-83. Where necessary the pulp samples were first diluted to 1 wt % solids with tap water, 2 ml of 10% alum solution added to each sample, and the slurry then thickened on a Buchner funnel using Ahlstrom grade 631-25 filter paper. The filter pads were air dried before taking brightness measurements. All brightness data was obtained using an ACS Spectrosensor II spectrophotometer and reported as TAPPI 452 brightness. The brightness data represents the percent of light at wavelength 452 nanometers which is reflected off the filter pad and recorded by the spectrophotometer.

COMPARATIVE EXAMPLES 1

A mixture of 20% OMG (old magazines), 80% ONP (old newspapers) (25% flexo printed) were shredded dry and combined to form a master batch. 90 g of the mixture was added to a laboratory pulper along with 1910 g water (120° F.) to make a final consistency of 4.5%. Using pipettes, a non-ionic surfactant predominantly containing a mixture of mono- and di-glycerides of tallow oil which has been alkoxylated (DI-600 available from High Point Chemical Corporation) was added at a dosage rate of 0.1%; sodium carbonate was added at a dosage rate of 0.7 %; and a fatty acid soap (tallow oil fatty acid sodium salt) (DI-280 available from High Point Chemical Corporation) was added at a dosage rate of 0.5%. All dosage rates are calculated on a 100% active basis based upon the dry weight of waste paper added to the pulper. $CaCl_2$ was added to produce a water hardness of 150 ppm as $Ca^{+2}$. The combination of chemicals, water and waste paper was then pulped for 10 minutes. Then the contents were diluted to 1% using an additional 7,000 g water (120° F). A filter pad (identified as "Fb" for "before flotation") was made for measuring the brightness of the deinked pulp at this point. Half the 1% stock slurry was then placed in a laboratory flotation cell and run for 6 minutes with an air flow of 4.5 liters per minute. The froth that collected on the surface was removed periodically and the foam height measured. After 6 minutes the air flow to the flotation cell was stopped and the operation ended. Another filter pad (identified as "Fa" for "after flotation deinking") was made for measuring the brightness of the deinked pulp at this point.

EXAMPLE 1

The procedure of Comparative Example A was continued by transfering the second half of the 1% solution prepared therein into the flotation cell. A cationic polyamine polymer which is derived from the reaction of epichlorohydrin with an amine. (Hipochem C-75 from High Point Chemical Corporation) having a molecular weight of about 450,000 daltons and a cationicity of 95% was added at a dosage rate of 0.075 wt % based on the weight of fiber with stirring for 30 seconds. The air flow to the flotation cell was begun and continued for 6 minutes. The froth that collected on the surface was removed as described above and the height measured. A filter pad (identified as "Fca" for after flotation deinking in presence of a cationic polymer) was made for measuring the brightness of the deinked pulp at the end of the 6 minute flotation time.

A portion of each of the 1% solutions previously described was thickened on an 80 mesh sieve to a consistency of 10% to simulate a washing process. Filter pads were made from the thickened stock samples for measuring the brightness of the washed samples (identified as "Wa" for after washing without cationic polymer present and after deinking, and "Wca" for after washing with cationic polymer present).

Each of the filter pads of Comparative Example A and Example 1 were air dried and the brightness measured. The brightness results were as follows: Fb=38.8%; Fa=45.3%; Fca=49.9%; Wa=49.8%; and Wca=52.2%. Thus a flotation deinking process using only a non-ionic surfactant and a fatty acid increased the brightness by 6.5 "points" or % (45.3−38.8) but when the highly cationic low molecular weight cationic polymer was added the Δ-brightness increased to 11.1 points (49.9−38.8)—an improvement of 4.6 points in a technology in which a 1 point improvement is a commercially major and valuable advance. Similarly for the samples which were washed after the flotation deinking, the addition of the cationic polymer improved the brightness 2.4 points more than when it was omitted (52.2−49.8).

EXAMPLE 2

The procedure of Example 1 was repeated but varying the concentration of the three additives, i.e. the non-ionic surfactant, the fatty acid/salt, and the cationic polymer. The results of the tests are shown in Table I.

TABLE I

| Exp. # | DOSAGE RATES | | | BRIGHTNESS RATES | | | |
|---|---|---|---|---|---|---|---|
| | % Non-Ionic | % FA | % Cat Polym. | Fb | Fa | Wca | DELTA BR |
| 1 | 0.2 | 0.4 | 0.2 | 38.6 | 50.8 | 53.2 | 12.2 |
| 2 | 0.2 | 0.4 | 0.05 | 38.6 | 50.4 | 53.0 | 11.8 |
| 3 | 0.2 | 0.4 | 0.5 | 38.6 | 50.5 | 53.0 | 11.9 |
| 4 | 0.2 | 0.2 | 0.2 | 38.4 | 50.4 | 53.1 | 12.0 |
| 5 | 0.2 | 0.8 | 0.2 | 38.9 | 50.6 | 53.1 | 11.6 |
| 6 | 0.05 | 0.4 | 0.2 | 38.4 | 50.0 | 52.8 | 11.6 |
| 7 | 0.4 | 0.4 | 0.2 | 38.5 | 50.2 | 52.9 | 11.7 |
| 8 | 0.4 | 0.2 | 0.05 | 38.4 | 50.1 | 53.0 | 11.7 |
| 9 | 0.01 | 0.05 | 0.01 | 38.2 | 49.5 | 52.1 | 11.3 |
| 10 | 0.6 | 1.0 | 1.0 | 39.0 | 49.9 | 52.2 | 10.9 |
| 11 | 0.005 | 0.95 | 0.9 | 37.8 | 46.3 | 47.8 | 8.5 |
| 12 | 0.01 | 0.04 | 0.02 | 37.6 | 45.9 | 47.5 | 8.3 |
| 13 | 0.6 | 1.0 | 1.05 | 39.0 | 47.4 | 49.5 | 8.4 |
| 14 | 0.2 | 0.4 | 1.1 | 38.6 | 45.8 | 48.9 | 7.2 |

TABLE I-continued

| Exp. # | Ionic | % FA | Polym. | Fb | Fa | Wca | BR |
|---|---|---|---|---|---|---|---|
| 15 | 0.2 | 0.03 | 0.2 | 37.2 | 44.5 | 48.8 | 7.3 |
| 1 | 0.2 | 0.4 | 0.2 | 38.6 | 50.8 | 53.2 | 12.2 |
| 16 | 0.65 | 0.4 | 0.2 | 38.4 | 45.6 | 48.8 | 7.2 |
| 17 | 0.65 | 0.03 | 1.1 | 37.3 | 44.5 | 49.3 | 6.6 |

EXAMPLE 3

Using the same procedure as in Examples 1 and 2 with pulping followed by flotation followed by washing a comparison was made using a non-ionic surfactant only; a fatty acid only; a combination of fatty acid and nonionic only; and the three component method of the present invention. The results are shown in Table II and III and clearly demonstrate the superiority of the method of the present invention as compared to using a fatty acid or non-ionic alone or the two in combination. In addition, it is clear that the brightness that occurs, occurs much faster with the method of the present invention than any of the other combinations (Table III). The brightness gain after 2 minutes with the method of the present invention is larger than the brightness gain after 6 minutes with the best alternative (the non-ionic+fatty acid dual system).

TABLE II

Brightness vs. Flotation Time of Example 3

| Non-ionic (%) | FA (%) | Cationic Polymer (%) | Fb | Fa2 | Fa4 | Fa6 |
|---|---|---|---|---|---|---|
| 0.4 | 0 | 0 | 35.4 | 39.7 | 40.1 | 41.0 |
| 0.0 | 0.5 | 0 | 39.4 | 40.7 | 41.7 | 42.5 |
| 0.1 | 0.25 | 0 | 36.7 | 40.3 | 42.0 | 42.9 |
| 0.1 | 0.25 | 0.075 | 37.6 | 45.8 | 48.8 | 50.0 |

TABLE III

Delta Brightness vs. Flotation Time of Example 3

| DIA(%) | FA(%) | POLYM- ER(%) | BRIGHTNESS GAIN (POINTS) 2 MIN | 4 MIN | 6 MIN |
|---|---|---|---|---|---|
| 0.4 | 0 | 0 | 2.3 | 4.7 | 5.6 |
| 0.0 | 0.5 | 0 | 1.3 | 2.3 | 3.1 |
| 0.1 | 0.25 | 0 | 3.6 | 5.3 | 6.2 |
| 0.1 | 0.25 | 0.075 | 8.2 | 11.2 | 12.4 |

DIA(%) = DOSAGE RATE OF THE NONIONIC SURFACTANT
FA(%) = DOSAGE RATE OF THE FATTY ACID SOAP
POLYMER(%) = DOSAGE RATE OF THE POLYAMINE
Fb = BRIGHTNESS BEFORE FLOTATION
Fa2 = BRIGHTNESS AFTER FLOTATION TIME OF 2 MINUTES
Fa4 = BRIGHTNESS AFTER FLOTATION TIME OF 4 MINUTES
Fa6 = BRIGHTNESS AFTER FLOTATION TIME OF 6 MINUTES

COMPARATIVE EXAMPLE B

The procedure described in Example 1 was followed except that a cationic polyacrylamide polymer having a molecular weight of about 4,000,000 daltons and sold under the product designation Hipochem I-48 by High Point Chemical Corporation was used instead of the cationic polyamine. The pulp slurry was flocculated and floated to the surface where it was removed as part of the flotation rejects. There was not enough pulp left in the flotation cell to even make a filter pad and the test was terminated without doing the washing of Example 2.

EXAMPLE 4

The procedure described in Example 1 was followed and the clarity of the filtrate from the wash stage was measured using a clarity wedge. A clarity wedge is scaled from 0 to 46 as an indication of how clear the water is. A low reading means the water is very murky while a high reading means the water is very clear. Using the non-ionic surfactant or the non-ionic surfactant plus the fatty acid salt thereof of Comparative Example A, the readings were both 0. When the method of this invention was used, i.e. the cationic polymer added in addition to the non-ionic surfactant and fatty acid salt, the result was 35.

EXAMPLE 5

The procedure described in Comparative Example A and Example 1 was followed except that a polyethylenimine of MW about 200,000 was used instead of the polyamine. The non-ionic surfactant was a $C_{18}$ alcohol alkoxylate sold under the product designation DI-1765 by High Point Chemical Corporation and the fatty acid was a Coco Oil potassium salt. The starting furnish was 15% OMG and 85% ONP (25% Flexo). The brightness gain in flotation was above 10 points and the actual brightness values were essentially the same as those obtained using the polyamine described in Example 1. The following table shows the results with a range of dosage rates of the three components.

TABLE IV

Brightness and Delta Brightness Data

| | DOSAGE RATES | | | BRIGHTNESS RESULTS | | | |
|---|---|---|---|---|---|---|---|
| Exp. # | % Non-ionic | % FA | % Cat Polym. | Fb | Fca | Wca | Delta BR |
| 1 | 0.2 | 0.4 | 0.2 | 38.5 | 50.9 | 53.4 | 12.4 |
| 2 | 0.2 | 0.4 | 0.075 | 38.5 | 50.5 | 53.0 | 12.0 |
| 3 | 0.2 | 0.4 | 0.5 | 38.5 | 50.3 | 53.0 | 11.8 |
| 4 | 0.2 | 0.25 | 0.2 | 38.0 | 50.2 | 53.1 | 11.8 |
| 5 | 0.2 | 0.8 | 0.2 | 37.9 | 50.0 | 53.1 | 12.1 |
| 6 | 0.05 | 0.4 | 0.2 | 38.0 | 50.1 | 52.8 | 12.1 |
| 7 | 0.35 | 0.4 | 0.2 | 37.8 | 50.0 | 52.9 | 12.2 |
| 8 | 0.35 | 0.25 | 0.075 | 37.9 | 49.7 | 53.0 | 11.8 |
| 9 | 0.01 | 0.05 | 0.01 | 38.1 | 49.9 | 52.1 | 11.8 |
| 10 | 0.6 | 1.0 | 1.0 | 38.0 | 50.0 | 52.2 | 12.0 |
| 11 | 0.005 | 0.95 | 0.9 | 37.0 | 46.0 | 48.4 | 9.0 |
| 12 | 0.01 | 0.04 | 0.02 | 37.2 | 46.1 | 48.6 | 8.0 |
| 13 | 0.6 | 1.0 | 1.05 | 38.0 | 47.3 | 48.8 | 9.3 |
| 14 | 0.2 | 0.4 | 1.1 | 37.3 | 46.5 | 48.9 | 9.2 |
| 15 | 0.2 | 0.03 | 0.2 | 37.1 | 44.3 | 48.9 | 7.2 |
| 16 | 0.65 | 0.4 | 0.2 | 37.3 | 45.2 | 48.7 | 7.9 |
| 17 | 0.65 | 0.03 | 1.1 | 37.0 | 44.0 | 48.1 | 7.0 |

What is claimed is:

1. In the flotation deinking of printed media in which at least about 7.5 wt % of the media was printed with a hydrophilic flexographic ink having a particle size of less than about 5 μm by performing the steps of:
(1) forming a pulping slurry of printed media and water;
(2) adding to the slurry
(i) a non-ionic surfactant of the formula:

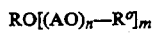

$RO[(AO)_n\text{—}R^q]_m$ wherein R is selected from the group consisting of (a) linear and branched alkyl and alkenyl groups having about 7 to about 24 carbon atoms; (b) $R^1CO$— wherein $R^1$ is a linear or branched alkyl or alkenyl group having 7 to 24 carbon atoms; (c) $(R^2)_aC_6H_{5-a}$— wherein $R^2$ is linear or branched $C_7$-$C_{18}$ alkyl and alkenyl and "a" is an integer from 1 to 3; (d) a group derived from a linear, branched, and cyclic aliphatic polyol having 2 to 6 carbon atoms; and (e) a group derived from a linear, branched, and cyclic aliphatic diacid having 8 to 42 carbon atoms; AO is an oxyalkylene group having 2 to 4 carbon atoms or a mixture of such groups in random or block configuration; $R^o$ is selected from the group consisting of H, $R^1$ and $R^1CO$; n is a number from about 4 to 250; and m is an integer from about 2 to 6; and (ii) a fatty acid or salt thereof of the formula $R^5COOM$ wherein $R^5$ is a linear or branched alkyl or alkenyl group having 7 to 48 carbon atoms and M is hydrogen or a counterion; and (3) subjecting the slurry to flotation deinking in a flotation cell, the improvement comprising further adding to the slurry prior to the flotation deinking (iii) a water-soluble cationic polymer having a weight average molecular weight of less than about 1,000,000 daltons and a cationicity of at least about 50%, said cationic polymer being added in an amount sufficient to increase brightness of a filter pad prepared from the media by at least about 2% wherein the non-ionic surfactant, the fatty acid or salt, and the cationic polymer agglomerate the flexographic ink prior to the flotation deinking.

2. The method of claim 1, wherein the non-ionic surfactant is added to the slurry during pulping.

3. The method of claim 1, wherein the water-soluble cationic polymer is added after pulping is completed and prior to the commencement of an air flow for the flotation deinking.

4. The method of claim 1, wherein the non-ionic surfactant is derived from mono-and diglycerides of a naturally occurring fatty acid which have been alkoxylated.

5. The method of claim 4, wherein the non-ionic surfactant comprises a mixture of:

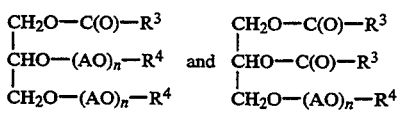

wherein $R^3$ is an alkyl group derived from tallow and $R^4$ is selected from the group consisting of H and $R^1CO$.

6. The method of claim 4, wherein the non-ionic surfactant is derived from the reaction of a naturally existing oil, glycerol, an alkylene oxide selected from the group consisting of ethylene oxide, propylene oxide, and mixtures thereof, in the presence of an alkaline catalyst.

7. The method of claim 6, wherein the non-ionic surfactant is derived from the reaction of tallow with glycerol, ethylene oxide and propylene oxide, in the presence of potassium hydroxide.

8. The method of claim 1, wherein M is a counterion selected from the group consisting of Na, K, Ca, $NH_4$, and $NH_x(CH_2-CH_2OH)_y$, wherein x and y are each integers from 0 to 4 and the sum of x+y is 4.

9. The method of claim 1, wherein the fatty acid or salt thereof is a mixture derived from a natural oil selected from the group consisting of marine, rapeseed, tallow, tall oil, soy, cottonseed, and coconut oils.

10. The method of claim 1, wherein the molecular weight of the cationic polymer is less than about 500,000 daltons.

11. The method of claim 10, wherein the molecular weight of the cationic polymer is less than about 200,000 daltons.

12. The method of claim 10, wherein the cationicity of the cationic polymer is at least about 90%.

13. The method of claim 10, wherein the cationic polymer is derived from the reaction product of epichlorohydrin and a $C_{2-6}$ dialkylamine or a mixture of a $C_{2-6}$ dialkylamine and an aliphatic diamine having 1 to 8 carbon atoms.

14. The method of claim 10, wherein the cationic polymer is a polyethyleneimine polymer obtained by the polymerization of an aziridine or a quaternized derivative thereof.

15. The method of claim 1, wherein the non-ionic surfactant is present in an amount of from about 0.01 to 0.6 wt %, the fatty acid or salt thereof is present in an amount of from about 0.05 to 1.8 wt % and the cationic surfactant is present in an amount of from about 0.005 to 0.5 wt %, all percents based upon the dry weight of the printed media.

16. The method of claim 1, wherein the flotation deinking is performed at a water hardness of about 50 to about 350 ppm $Ca^{+2}$.

17. The method of claim 1, wherein the flotation deinking is performed at a water hardness of about 80 to about 150 ppm $Ca^{+2}$.

18. The method of claim 1, wherein after pulping and before flotation deinking the slurry is washed and the fatty acid or salt thereof and cationic polymer are added after completion of the washing.

19. In the flotation deinking of printed media in which at least about 7.5 wt % of the media was printed with a hydrophilic flexographic ink having a particle size of less than about 5 μm by performing the steps of:
(1) forming a pulping slurry of printed media and water;
(2) adding to the slurry (i) a nonionic surfactant of the formula:

wherein R is selected from the group consisting of (a) linear and branched alkyl and alkenyl groups having 7 to about 24 carbon atoms; (b) $R^1CO-$ wherein $R^1$ is a linear or branched alkyl or alkenyl group having 7 to 24 carbon atoms; (c) $(R^2)_aC_6H_{5-a}-$ wherein $R^2$ is linear or branched $C_7-C_{18}$ alkyl and alkenyl and "a" is an integer from 1 to 3; (d) a group derived from a linear, branched, and cyclic aliphatic polyol having 2 to 6 carbon atoms; and (e) a group derived from a linear, branched, and cyclic aliphatic diacid having about 8 to 42 carbon atoms; AO is an oxyalkylene group having 2 to 4 carbon atoms or a mixture of such groups in random or block configuration; $R^o$ is selected from the group consisting of H, $R^1$ and $R^1CO$; n is a number from about 4 to 250; and m is an integer from about 2 to 6; and (ii) a fatty acid or salt thereof of the formula $R^5COOM$ wherein $R^5$ is a linear or branched alkyl or alkenyl group having 7 to 48 carbon atoms and M is hydrogen or a counterion; and (iii) subjecting the slurry to flotation deinking in a flotation cell, the improvement comprising further adding to the slurry prior to the flotation deinking (iii) a water-soluble cationic polymer having a weight average molecular weight of less than about 1,000,000 daltons and a cationicity of at least about 50%, said cationic polymer being added in an amount sufficient to increase the rate of ink removal as a function of time in the flotation cell wherein the nonionic surfactant, the fatty acid or salt, and the cationic polymer agglomerate the flexographic ink prior to the flotation deinking.

20. The method of claim 19, wherein the non-ionic surfactant is added to the slurry prior to the commencement of an air flow for the flotation deinking.

21. The method of claim 19, wherein the non-ionic surfactant is derived from mono-and diglycerides of a naturally occurring fatty acid which have been alkoxylated.

22. The method of claim 21, wherein the non-ionic surfactant comprises a mixture of:

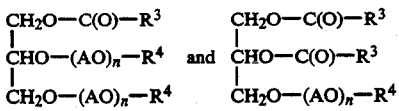

wherein $R^3$ is an alkyl group derived from tallow and $R^4$ is selected from the group consisting of H and $R^1CO$.

23. The method of claim 19, wherein the fatty acid or salt thereof is a mixture derived from a natural oil selected from the group consisting of marine, rapeseed, tallow, tall oil, and coconut oils.

24. The method of claim 19, wherein the molecular weight of the cationic polymer is less than about 500,000 daltons and the cationicity of the cationic polymer is at least about 90%.

25. The method of claim 19, wherein the cationic polymer is selected from the group consisting of (A) polymers derived from the reaction product of epichlorohydrin and a $C_{2-6}$ dialkylamine or a mixture of a $C_{2-6}$ dialkylamine and an aliphatic diamine having 1 to 8 carbon atoms and (B) a polyethyleneimine polymer obtained by the polymerization of an aziridine or a quaternized derivative thereof.

26. The method of claim 19, wherein the non-ionic surfactant is present in an amount of from about 0.01 to 0.6 wt %, the fatty acid or salt thereof is present in an amount of from about 0.05 to 1.8 wt % and the cationic surfactant is present in an amount of from about 0.005 to 0.5 wt %, all percents based upon the dry weight of the printed media.

27. The method of claim 19, wherein the flotation deinking is performed at a water hardness of about 50 to about 350 ppm $Ca^{+2}$.

28. The method of claim 19, wherein the flotation deinking is performed at a water hardness of about 80 to about 150 ppm $Ca^{+2}$.

29. In the flotation deinking of printed media in which at least about 7.5 wt % of the media was printed with a hydrophilic flexographic ink having a particle size of less than about 5 μm by performing the steps of: (1) forming a pulping slurry of printed media and water; (2) adding to the slurry (i) a nonionic surfactant of the formula:

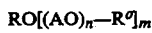

wherein R is selected from the group consisting of (a) linear and branched alkyl and alkenyl groups having 7 to about 24 carbon atoms; (b) $R^1CO$— wherein $R^1$ is a linear or branched alkyl or alkenyl group having 7 to 24 carbon atoms; (c) $(R^2)_aC_6H_{5-a}$— wherein $R^2$ is linear or branched $C_7$-$C_{18}$ alkyl and alkenyl and "a" is an integer from 1 to 3; (d) a group derived from a linear, branched, and cyclic aliphatic polyol having 2 to 6 carbon atoms; and (e) a group derived from a linear, branched, and cyclic aliphatic diacid having 8 to 42 carbon atoms; AO is an oxyalkylene group having 2 to 4 carbon atoms or a mixture of such groups in random or block configuration; $R^o$ is selected from the group consisting of H, $R^1$ and $R^1CO$; n is a number from about 4 to 250; and m is an integer from about 2 to 6; and (ii) a fatty acid or salt thereof of the formula $R^5COOM$ wherein $R^5$ is a linear or branched alkyl or alkenyl group having 7 to 48 carbon atoms and M is hydrogen or a counterion; and (iii) subjecting the slurry to flotation deinking in a flotation cell, the improvement comprising further adding to the slurry prior to the flotation deinking (iii) a water-soluble cationic polymer having a weight average molecular weight of less than about 1,000,000 daltons and a cationicity of at least about 50%, said cationic polymer being added in an amount sufficient to increase the drainage rate of deinked media.

30. The method of claim 29, wherein the non-ionic surfactant is added to the slurry prior to the commencement of an air flow for the flotation deinking.

31. The method of claim 29, wherein the non-ionic surfactant is derived from mono-and diglycerides of a naturally occurring fatty acid which have been alkoxylated.

32. The method of claim 31, wherein the non-ionic surfactant comprises a mixture of:

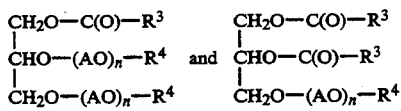

wherein $R^3$ is an alkyl group derived from tallow and $R^4$ is selected from the group consisting of H and $R^1CO$.

33. The method of claim 29, wherein the fatty acid or salt thereof is a mixture derived from a natural oil selected from the group consisting of marine, rapeseed, tallow, tall oil, soy, cottonseed, and coconut oils.

34. The method of claim 29, wherein the molecular weight of the cationic polymer is less than about 500,000 daltons and the cationicity of the cationic polymer is at least about 90%.

35. The method of claim 29, wherein the cationic polymer is selected from the group consisting of (A) polymers derived from the reaction product of epichlorohydrin and a $C_{2-6}$ dialkylamine or a mixture of a $C_{2-6}$ dialkylamine and an aliphatic diamine having 1 to 8 carbon atoms and (B) a polyethyleneimine polymer obtained by the polymerization of an aziridine or a quaternized derivative thereof.

36. The method of claim 29, wherein the non-ionic surfactant is present in an amount of from about 0.01 to 0.6 wt %, the fatty acid or salt thereof is present in an amount of from about 0.05 to 1.8 wt % and the cationic surfactant is present in an amount of from about 0.005 to 0.5 wt %, all percents based upon the dry weight of the printed media.

37. The method of claim 29, wherein the flotation deinking is performed at a water hardness of about 50 to about 350 ppm $Ca^{+2}$.

38. The method of claim 29, wherein the flotation deinking is performed at a water hardness of about 80 to about 150 ppm $Ca^{+2}$.

39. A method of deinking printed media in which at least about 7.5 wt % of the media has been printed with a hydrophilic flexographic ink having a particle size of less than about 5 μm comprising the steps of:
 (i) forming a pulping slurry of printed media and water;
 (ii) adding to the slurry:
  (a) a non-ionic surfactant which is represented by the formula:

$RO[(AO)_n-R^q]_m$ wherein R is selected from the group consisting of: linear and branched alkyl and alkenyl groups having about 7 to about 24 carbon atoms; $R^1CO-$ wherein $R^1$ is a linear or branched alkyl or alkenyl group having 7 to 24 carbon atoms; $(R^2)_aC_6H_{5-a}-$ wherein $R^2$ is linear or branched $C_7-C_{18}$ alkyl and alkenyl and "a" is an integer from 1 to 3; a group derived from a linear, branched, and cyclic aliphatic polyol having 2 to 6 carbon atoms; and a group derived from a linear, branched, and cyclic aliphatic diacid having about 8 to 42 carbon atoms; AO is an oxyalkylene group having 2 to 4 carbon atoms or a mixture of such groups in random or block configuration; $R^o$ is selected from the group consisting of H, $R^1$ and $R^1CO$; n is a number from about 4 to 250; and m is an integer from 2 to about 6;
  (b) a fatty acid or salt thereof of the formula $R^5COOM$ wherein $R^5$ is an alkyl or alkenyl group having 7 to 48 carbon atoms and M is hydrogen or a counterion;
  (c) a water-soluble cationic polymer having a weight average molecular weight of less than about 1,000,000 daltons and a cationicity of at least about 50%, wherein the nonionic surfactant, the fatty acid and the cationic polymer agglomerate the flexographic ink; and
 (iii) subjecting the slurry to flotation deinking.

40. The method of claim 39, wherein the non-ionic surfactant is added to the slurry prior to the commencement of an air flow for the flotation deinking.

41. The method of claim 39, wherein the non-ionic surfactant is derived from mono-and diglycerides of a naturally occurring fatty acid which have been alkoxylated.

42. The method of claim 41, wherein the non-ionic surfactant comprises a mixture of:

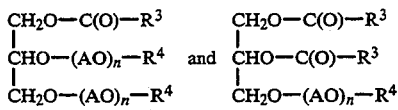

wherein $R^3$ is an alkyl group derived from tallow and $R^4$ is selected from the group consisting of H and $R^1CO$.

43. The method of claim 39, wherein the fatty acid or salt thereof is a mixture derived from a natural oil selected from the group consisting of marine, rapeseed, tallow, tall oil, soy, cottonseed, and coconut oils.

44. The method of claim 39, wherein the molecular weight of the cationic polymer is less than about 500,000 daltons and the cationicity of the cationic polymer is at least about 90%.

45. The method of claim 39, wherein the cationic polymer is selected from the group consisting of (A) polymers derived from the reaction product of epichlorohydrin and a $C_{2-6}$ dialkylamine or a mixture of a $C_{2-6}$ dialkylamine and an aliphatic diamine having 1 to 8 carbon atoms and (B) a polyethyleneimine polymer obtained by the polymerization of an aziridine or a quaternized derivative thereof.

46. The method of claim 39, wherein the non-ionic surfactant is present in an amount of from about 0.01 to 0.6 wt %, the fatty acid or salt thereof is present in an amount of from about 0.05 to 1.8 wt % and the cationic surfactant is present in an amount of from about 0.005 to 0.5 wt %, all percents based upon the dry weight of the printed media.

47. The method of claim 39, wherein the flotation deinking is performed at a water hardness of about 50 to about 350 ppm $Ca^{+2}$.

48. The method of claim 39, wherein the flotation deinking is performed at a water hardness of about 80 to about 150 ppm $Ca^{+2}$.